United States Patent [19]

Chang et al.

[11] Patent Number: 5,716,090
[45] Date of Patent: Feb. 10, 1998

[54] STAGE STRUCTURE DISPOSED TO A VEHICLE

[76] Inventors: Chi-chuan Chang, No. 106, Kwangfu Rd.; Sen-fu Yu, No. 54, Lane 29, Changchun Rd., both of Huwei Chen, Yunlin Hsien, Taiwan

[21] Appl. No.: 679,618

[22] Filed: Jul. 10, 1996

[51] Int. Cl.[6] ............................................. B62D 33/00
[52] U.S. Cl. .................................. 296/26; 52/66; 52/71
[58] Field of Search ............................ 296/26; 52/66, 52/71

[56] References Cited

U.S. PATENT DOCUMENTS

| | | | |
|---|---|---|---|
| 4,232,488 | 11/1980 | Hanley | 296/26 |
| 4,535,933 | 8/1985 | Kuiper | 296/26 |
| 5,078,442 | 1/1992 | Rau et al. | 296/26 |
| 5,152,109 | 10/1992 | Boers | 52/66 |
| 5,400,551 | 3/1995 | Uhl | 52/66 |
| 5,478,129 | 12/1995 | Goto et al. | 296/26 |
| 5,546,709 | 8/1996 | Decker et al. | 52/66 |

FOREIGN PATENT DOCUMENTS

| | | | |
|---|---|---|---|
| 197139 | 8/1989 | Japan | 296/26 |

*Primary Examiner*—Gary C. Hoge
*Attorney, Agent, or Firm*—Testa, Hurwitz & Thibeault, LLP

[57] ABSTRACT

A stage structure disposed to a vehicle which includes a head portion and the stage structure has a base connecting to the head portion, two first posts and two second posts respectively disposed to four corners of the base and a top cover mounted to the four posts wherein one side of the top cover is pivotally connected to two of the posts in a longitudinal direction of the base, a lower supporting board connected between each pair of two posts for a first cylinder disposed thereon which connects to a mediate part so as to lift the other side of the top cover, a first frame and a second frame respectively and retractably disposed below an under surface of the top cover, each of the first frame and the second frame respectively connected to a second cylinder and a third cylinder on the top cover, a third frame pivotally connected to the second frame, an extending base respectively pivotally connected to each one of two sides of the base such that a stage can be formed by extending these frames and extending bases, and the frames and extending bases can be retracted to be a box-like structure.

5 Claims, 8 Drawing Sheets

STAGE STRUCTURE DISPOSED TO A VEHICLE

BACKGROUND OF THE INVENTION

1. Field of the Invention

The present invention relates to a stage structure disposed to a vehicle and more particularly, to a stage structure that can be folded to be a large box disposed to a rear end of a vehicle.

2. Brief Description of the Prior Art

Merchants sometime establish a stage outside to display products or hold a concert on the stage. Generally, the stage consists of frames and boards, both of which are transported by trucks from where the frames and boards are supplied. Once the stage is established, it cannot be moved until the whole schedule is over and then the stage is dismantled, the merchants then search for another suitable place to establish the stage again. It is deemed to have too many steps to finish the whole stage, especially the quantity of frames and boards are such a large number that it takes so much time to manage them and to assemble or dismantle them.

A small type of stage which is disposed to a vehicle is shown in FIG. 1 wherein the vehicle includes a driver's cabin 72 and a rear box portion which has a bottom 73, a top 70 and four sides including an openable side (not shown). Two cylinders 80 are separately disposed to the bottom 73 and each of the cylinders 80 has a piston rod 82 retractably disposed in the cylinder 80 corresponding thereto and the two piston rods 82 pivotally connected to the top 70 so as to lift one side of the top 70 upwardly as shown in phantom lines in FIG. 1. Customers can see the goods displayed on the bottom 73 via the openable side. An inherent shortcoming of this type of stage structure is that the stage has a narrow space and only one side can be opened. This severely limits the function and image of a stage.

The present invention intends to provide a stage structure disposed to a vehicle which has a box disposed to a rear end of the vehicle and the box can be easily extended to be a stage, such that the present invention effectively mitigates and/or obviates the above-mentioned problems.

SUMMARY OF THE INVENTION

The present invention provides a stage structure disposed to a vehicle which includes a head portion and a box connected to the head portion, the box can be extended to be a stage and includes a base, a first wall, a second wall, a front wall near the head portion, a rear wall and a top cover.

The first side of the base has a first post disposed to each one of two ends thereof and a first wall is disposed between the two first posts, the second side of the base having a second post disposed to each one of two ends thereof and a second wall disposed between the two second posts.

Each pair of the first post and the second post disposed to the same end of the base have an upper supporting board and a lower supporting board connected therebetween, a central rod connected between each pair of the upper supporting board and the lower supporting board. The front wall is disposed to a front end of the base and covers a pair of the first post and the second post, the rear wall disposed to a rear end of the base and covers the other pair of the first post and the second post wherein at least one of the first wall, the second wall and the rear wall can be opened.

The top cover is mounted to and supported by the two upper supporting boards, the top cover having a second side thereof pivotally connected to the second wall of the box and a first side of the top cover being a free side.

Two mediate parts each have a first end and a second end, the first end thereof contacting an under surface of the top cover and the second end pivotally connected to the central rod corresponding thereto at a high point of the mediate part, two first cylinders each pivotally disposed to the lower supporting board corresponding thereto and a low point of each of the two mediate parts pivotally connected to a first shaft of the first cylinder corresponding thereto.

It is an object of the present invention to provide a stage structure disposed to a vehicle which has a box connecting to a head portion of the vehicle and the box can be extended to be a stage with an openable top cover.

It is another object of the present invention to provide a stage structure having a third extendible frame to hang lights thereon.

It is a further object of the present invention to provide a stage structure which has an advantage of extending or retracting the frames to be a stage or a box-like structure easily.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
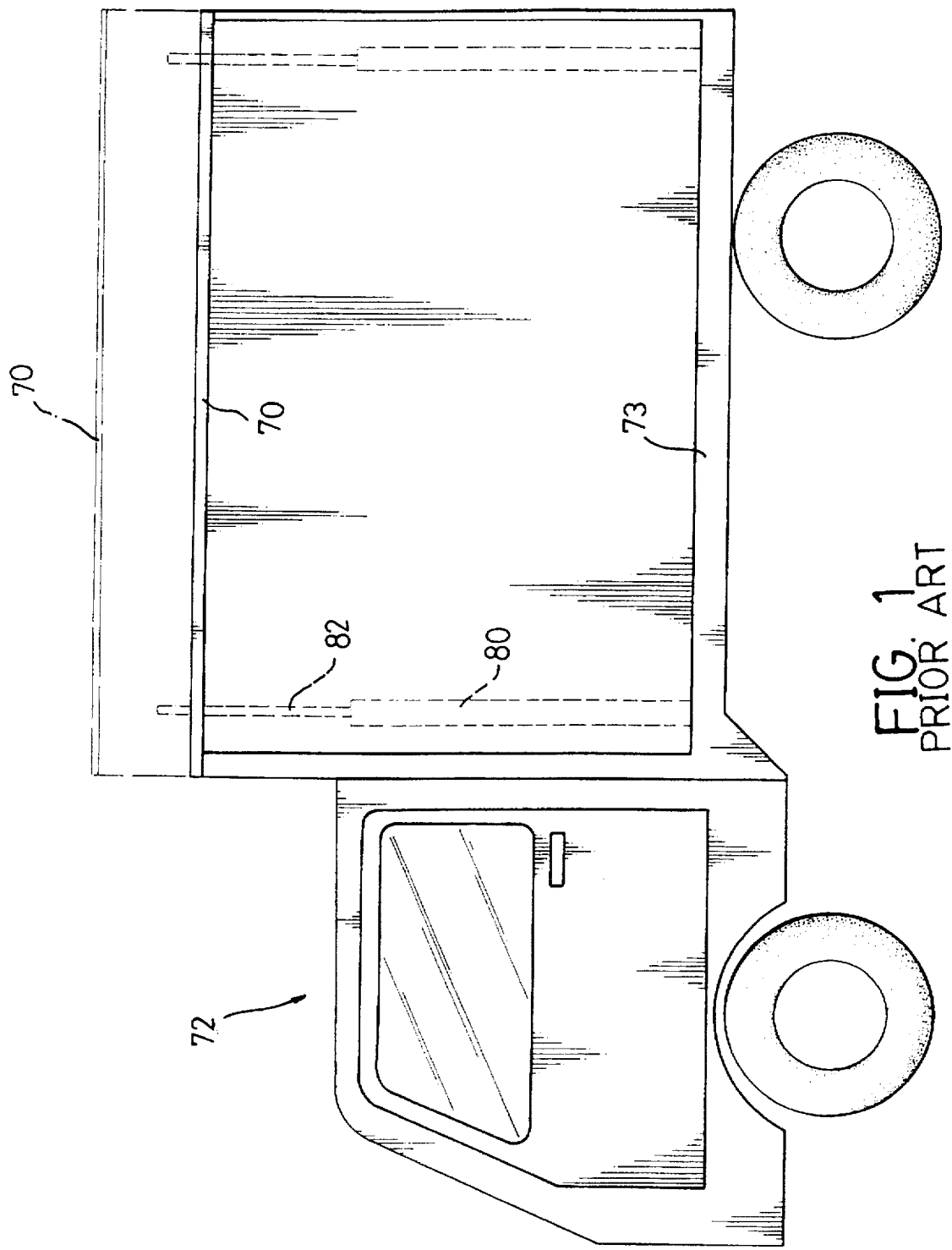
FIG. 1 is a side elevational view to show a conventional vehicle with a stage structure disposed thereto.
Figure 2:
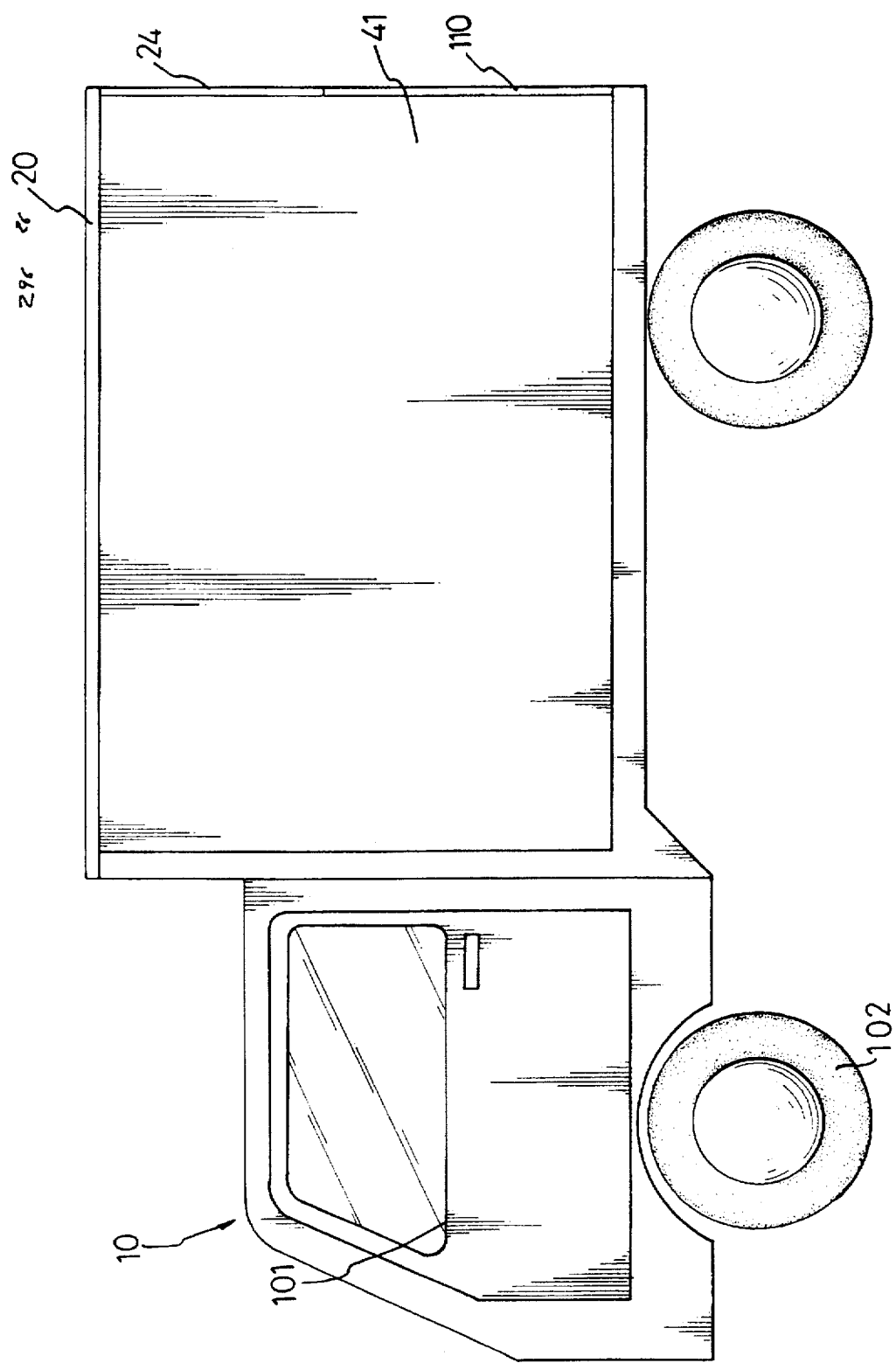
FIG. 2 is a side elevational view of a vehicle having a stage structure in a form of a box.
Figure 3:
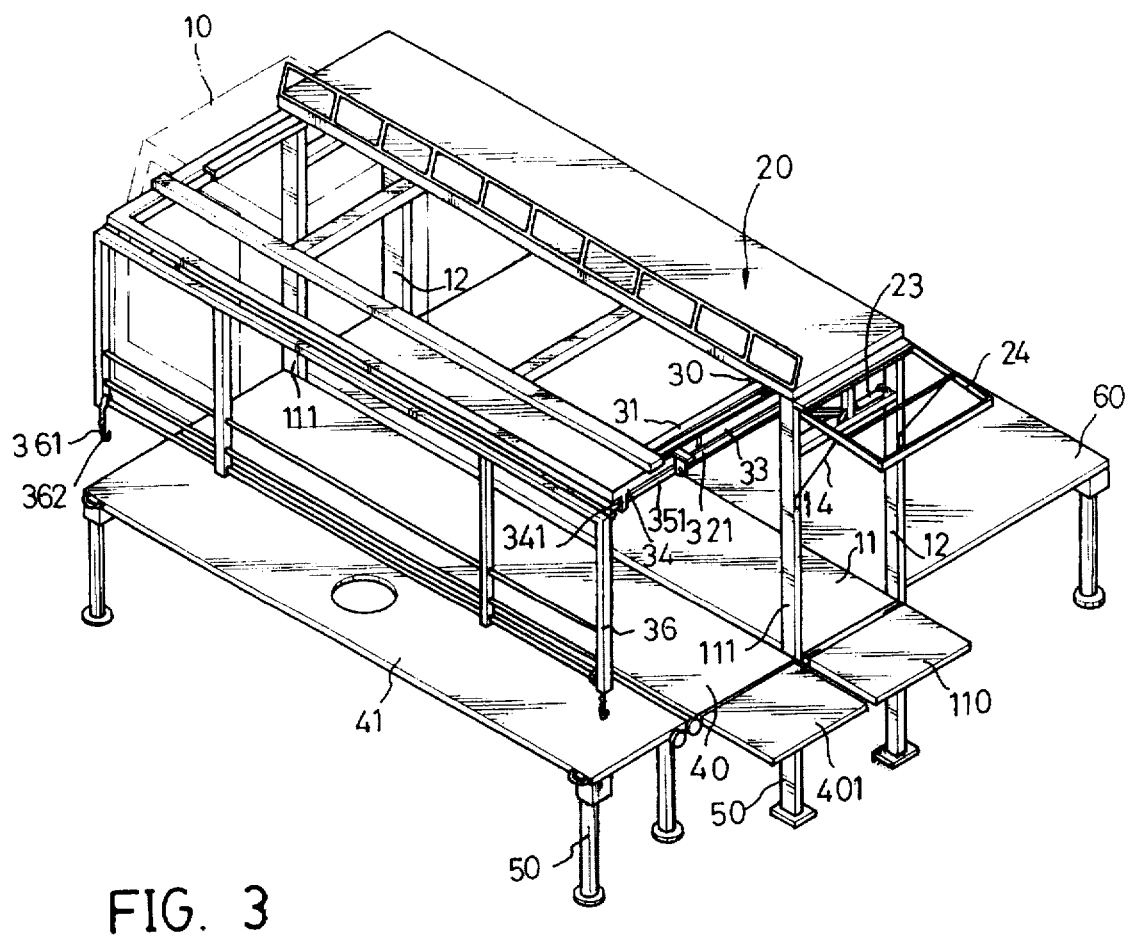
FIG. 3 is a perspective view of the stage structure extends from the vehicle in accordance with the present invention.
Figure 4:
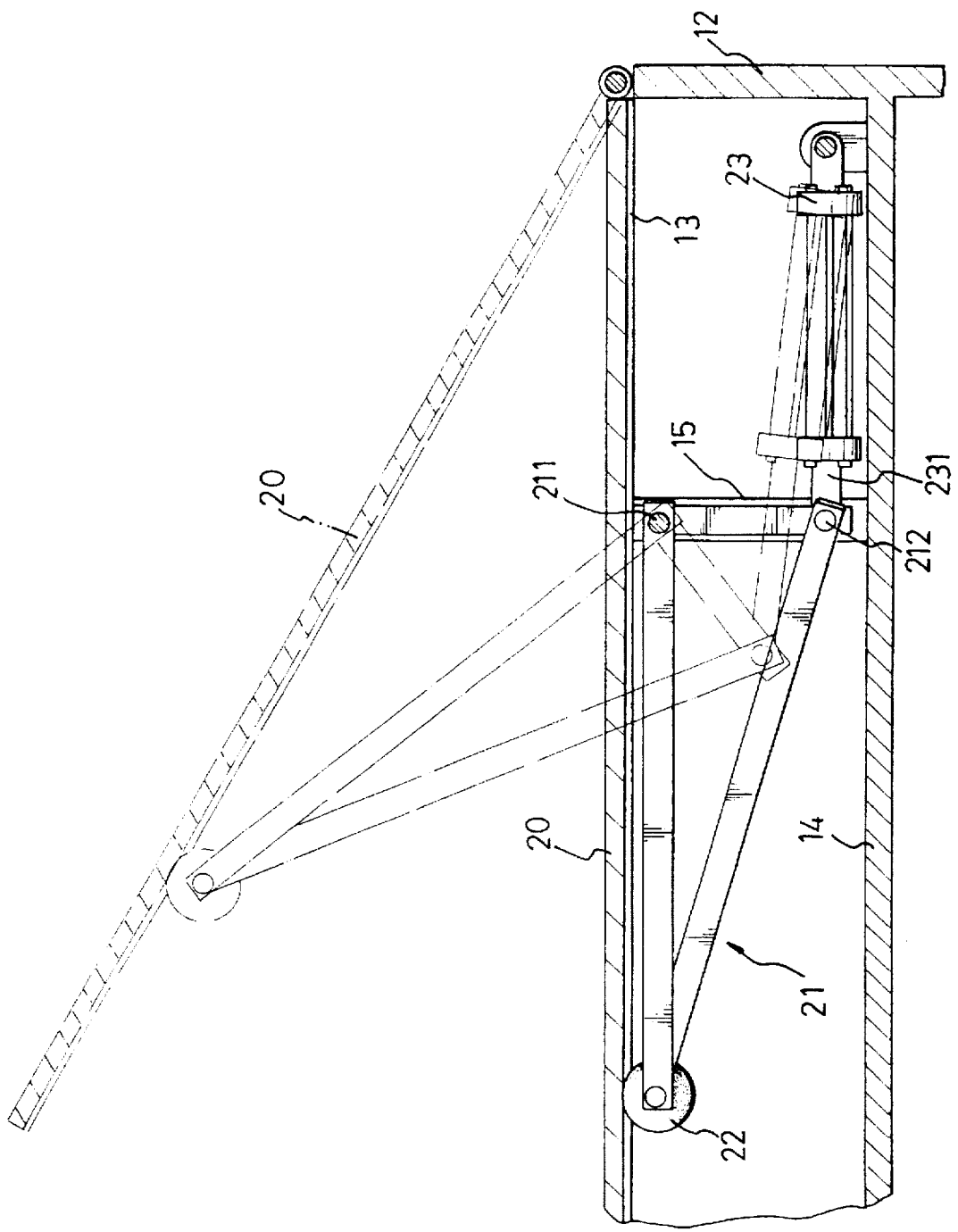
FIG. 4 is an end elevational view of part of the stage structure wherein a top cover is lifted upwardly and is shown in phantom lines.

Referring to the drawings and initially to FIGS. 2 and 3, a vehicle in accordance with the present invention generally includes a head portion 10 and a box which can be extended to be a stage structure and connects to the head portion 10, the head portion 10 including a driver's cabin 101 and front wheels 102 disposed to an under side thereof. The stage structure includes a base 11 having a first side, a second side, a front end connecting to the head portion 10 and a rear end. The first side of the base 11 has a first post 111 disposed to each one of two ends thereof and the second side of the base 11 has a second post 12 disposed to each one of two ends thereof. Referring to FIG. 4, each pair of the first post 111 and the second post 12 disposed to the same end of the base 11 has an upper supporting board 13 and a lower supporting board 14 transversely connected therebetween, a central rod 15 connecting between each pair of the upper supporting board 13 and the lower supporting board 14.

A top cover 20 which has a front end and a rear end and is mounted to and supported by the two upper supporting boards 13, the top cover 20 having a second side thereof pivotally connected to the two second posts 12 and a first side of the top cover 20 being a free side.

Two triangular mediate parts 21 each have a first end and a second end, the first end thereof having a roller 22 rotatably disposed thereto and the roller 22 contacting an under surface of the top cover 20, the second end of the mediate part 21 pivotally connected to the central rod 15 corresponding thereto at a high point 211 of the mediate part 21. Two first cylinders 23 each are pivotally disposed to the lower supporting board 14 corresponding thereto and a low point 212 of each of the two mediate parts 21 is pivotally connected to a first shaft 231 of the first cylinder 23 corresponding thereto such that when the first shaft 231 of each of the first cylinders 23 extends out, the low point 212 of each of the mediate parts 21 is pushed upwardly and the top cover 20 is pivoted upwardly about an axis of the second side thereof while the rollers 22 rolling on the under surface of the top cover 20.

Figure 5:
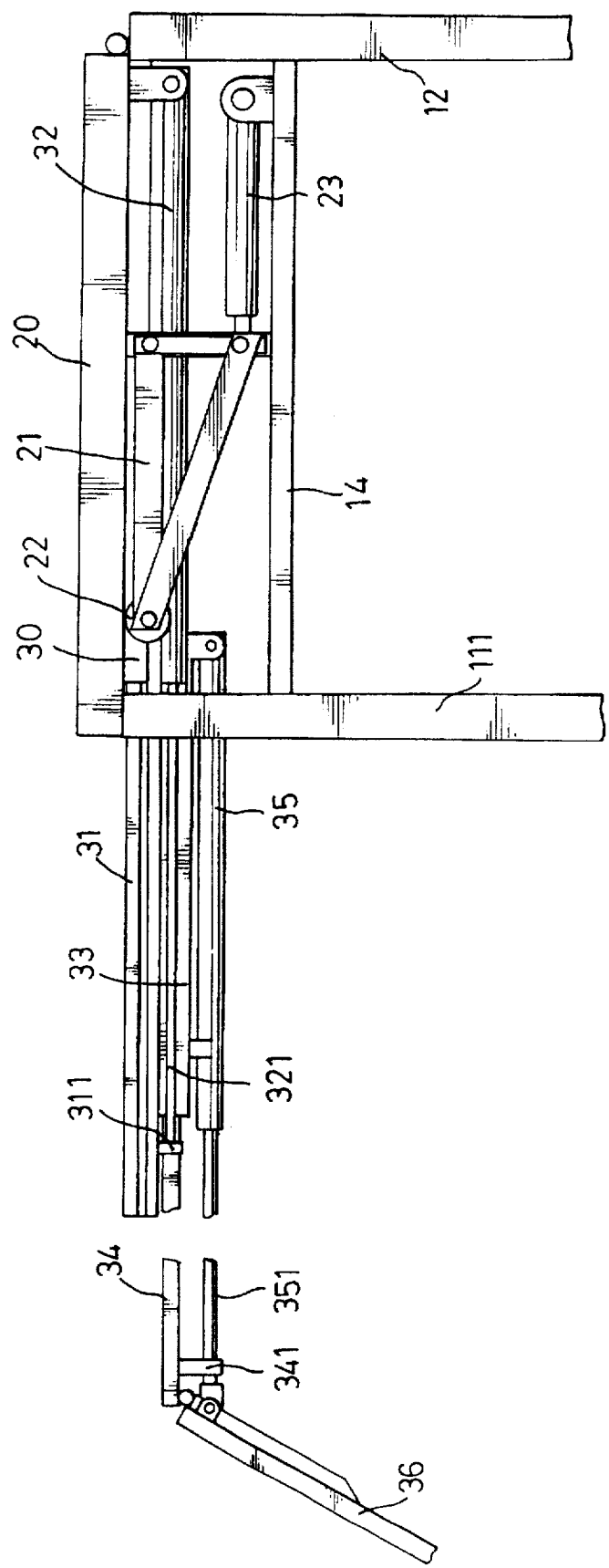
FIG. 5 is an end elevational view of part of the stage structure wherein a first frame, a second frame and a third frame are extended by respective cylinders.
Figure 6:
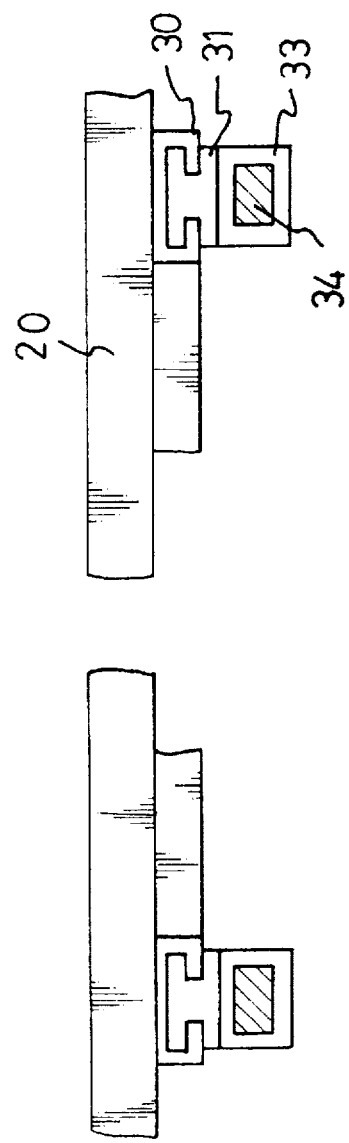
FIG. 6 is a side elevational view of part of the stage structure to show the arrangement of the first frame and the second frame.

Referring to FIGS. 5 and 6, two rails 30 are respectively disposed to the under surface of the front end and the rear end of the top cover 20. A first frame 31 is slidably connected via two end legs thereof to the two rails 30. The first frame has a first stop 311 extending downwardly from each one of two ends thereof. A second cylinder 32 is pivotally disposed to each of the front end and the rear end of the top cover 20 respectively and connected via a second shaft 321 of the second cylinder 32 to the corresponding first stop 311 such that the first frame 31 can be extended from a first side of the under surface of the top cover 20 by extending the second shaft 321 out.

Two tubular portions 33 each are disposed to an under side of the first frame 31, a second frame 34 having two ends thereof respectively slidably received in the two tubular portions 33. The second frame 34 has a second stop 341 extending downwardly therefrom at the two ends thereof. Two third cylinders 35 each are pivotally connected to an under surface of the respective tubular portion 33 and a third shaft 351 of each of the third cylinders 35 extending through the respective second stop 341 corresponding thereto. A third frame 36 is pivotally connected to the second frame 34 and is pivotally connected to a distal end of the third shaft 351 of the third cylinder 35 corresponding thereto such that the tubular portions 33 are moved together with the first frame 31 and both of the second frame 34 and the third frame 36 can be extended from the tubular portions 33 by extending the third shafts 351 wherein the third frame 36 is designed to dispose lighting devices thereon.

Referring back to FIG. 3, a first wall disposed between the two first posts 111 and includes a first extending base 40 pivotally connected to the first side of the base 11 and a second extending base 41 pivotally connected to the first extending base 40 so as to extend the effective area of the stage wherein a supporting means including two fourth cylinders 402 (see FIG. 7) are disposed to an under side of the base 11 and each of which has a fourth shaft 403 pivotally connected to the first extending base 40 so as to easily extend the first extending base 40 out. The first extending base 40 has two ends, each of the two ends having a first side extending plate 401 slidably received to the under side thereof. A second wall disposed between the two second posts 12 and includes a third extending base 60 pivotably connected to the second side of the base 11 and two fifth cylinders 602 (see FIGS. 7 and 8) are disposed to an under side of the base 11 opposite to the fourth cylinders 402 and each of which has a fifth shaft 603 pivotally connected to the third extending base 60 so as to easily extend the third extending base 60 out if needed.

The top cover 20 has a first side frame 24 pivotally connected to the rear end thereof, the base 11 having a second side frame 110 pivotally connected to the rear end thereof such that the first side frame 24 and the second side frame 110 can close the rear end of the box. A suitable number of legs 50 are respectively disposed to an under side of the first side extending plate 401, the second extending base 41 and the second side frame 110.

Figure 7:
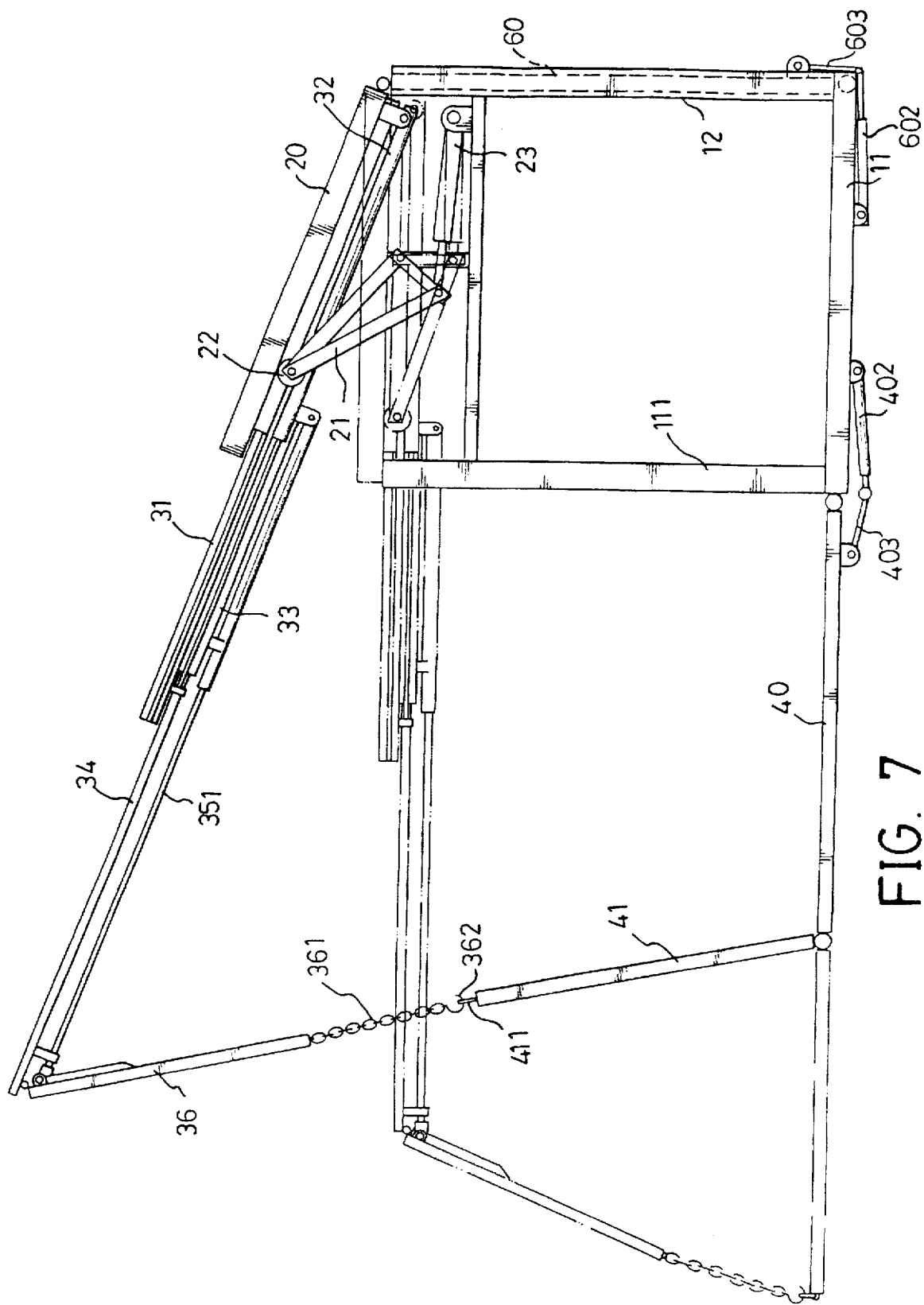
FIG. 7 is an end elevational view of part of the stage structure wherein the first frame and the second frame are extended when the top cover is lifted, and the third frame connected to a second extending base by a chain.

Referring to FIG. 7, in order to facilitate the operation to extend the second extending base 41 and to securely position the third frame 36, two rings 411 are disposed to a distal side of the second extending base 41 and two chains 361 are hung to the third frame 36 with a hook 362 disposed to each of the chains 361 for engaging to the respective ring 411 such that when the third frame 36 is extended out by operating the third cylinders 35, the second extending base 41 is pulled out till the second extending base 41 is positioned to a horizontal position.

Figure 8:
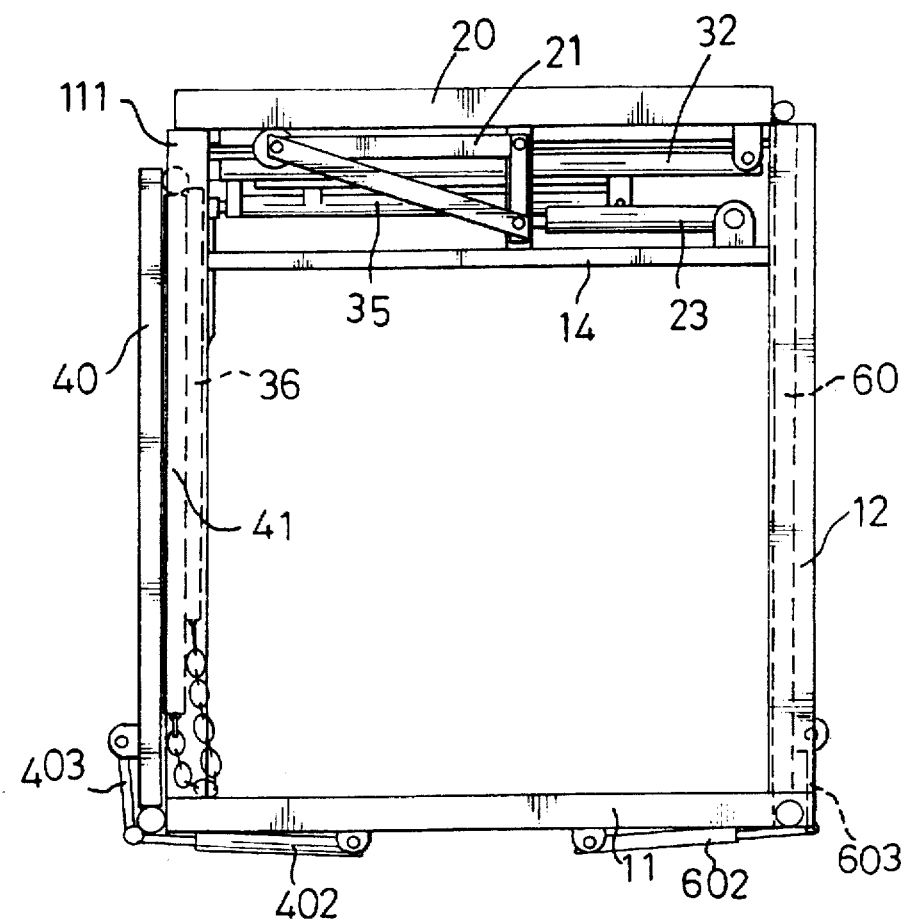
FIG. 8 is an end elevational view of the stage structure which is folded to be a box-like structure.

Referring to FIG. 8, when all the actions described above are reversely operated, the stage structure can be folded to be a box-like structure and is advantageously to be transported.

Accordingly, the present invention provides an advantage of establishing a stage from the box of the vehicle and the third frame 36 of the stage structure can be disposed with lighting devices, the top cover 20 can be pivoted upwardly to provide an optic effect of a large space of the stage. Therefore, the stage structure provides most of the basic and necessary functions which a formal stage requires.

Although the invention has been explained in relation to its preferred embodiment, it is to be understood that many other possible modifications and variations can be made without departing from the spirit and scope of the invention as hereinafter claimed.

What is claimed is:

1. A stage structure disposed to a vehicle which comprises a head portion and a box connected to said head portion, said box including a base having a first side and a second side, a top cover, a first wall, a second wall, a front wall near said head portion and a rear wall;

said first side of said base having a first post disposed to each one of two ends thereof and said second side of said base having a second post disposed to each one of two ends thereof, each pair of said first post and said second post disposed to the same end of said base having an upper supporting board and a lower supporting board connected therebetween, a central rod connected between each pair of said upper supporting board and said lower supporting board;

said first wall disposed to a first side of said base and between said two first posts, said second wall disposed to a second side of said base and between said two second posts, said front wall disposed to a front end of said base and between one pair of said first post and said second post, said rear wall disposed to a rear end of said base and between the other pair of said first post and said second post wherein at least one of said first wall, said second wall and said rear wall can be opened;

said top cover which has a front end and a rear end and is mounted to and supported by said two upper supporting boards, said top cover having a second side thereof pivotally connected to said two second posts and a first side of said top cover being a free side, and two mediate parts each having a first end and a second end, said first end thereof contacting an under surface of said top cover and said second end pivotally connected to said central rod corresponding thereto at a high point of said mediate part, two first cylinders each pivotally disposed to said lower supporting board corresponding thereto and a low point of each of said two mediate parts pivotally connected to a first shaft of said first cylinder corresponding thereto.

2. A stage structure comprises a base, said base including a first side, a second side, a front end and a rear end;

said first side of said base having a first post disposed to each one of two ends thereof and said second side of said base having a second post disposed to each one of two ends thereof, each pair of said first post and said second post disposed to the same end of said base having an upper supporting board and a lower supporting board respectively connected therebetween, a central rod connected between each pair of said upper supporting board and said lower supporting board;

a top cover which has a front end and a rear end and is mounted to and supported by said two upper supporting boards, said top cover having a second side thereof pivotally connected to said two second posts and a first side of said top cover being a free side;

two mediate parts each having a first end and a second end, said first end thereof contacting an under surface of said top cover and said second end pivotally connected to said central rod corresponding thereto at a high point of said mediate part, two first cylinders each pivotally disposed to said lower supporting board corresponding thereto and a low point of each of said two mediate parts pivotally connected to a first shaft of said first cylinder corresponding thereto;

two rails respectively disposed to said under surface of said front end and said rear end of said top cover, a first frame slidably connected to said two rails, said first frame having a first stop extending downwardly from each one of two ends thereof, a second cylinder pivotally disposed to each of said front end and said rear end of said top cover and connected a second shaft of said second cylinder to said corresponding first stop;

two tubular portions each disposed to an under side of said first frame, a second frame having two ends thereof slidably respectively received in said two tubular portions, said second frame having a second stop extending downwardly from each of said two ends thereof, two third cylinders each pivotally connected to an under surface of said respective tubular portion and a third shaft of each of said third cylinders extending through said respective second stop corresponding thereto, a third frame pivotally connected to said second frame and pivotally connected to a distal end of said third shaft of said third cylinder corresponding thereto, and a first extending base pivotally connected to said first side of said base and a third extending base pivotally connected to said second side of said base.

3. The stage structure as claimed in claim 2 wherein said first extending base has a second extending base pivotally connected thereto.

4. The stage structure as claimed in claim 2 wherein said first extending base has two ends, each of said two ends having a first side extending plate slidably received to an under side thereof.

5. The stage structure as claimed in claim 2 wherein said top cover has a first side frame pivotally connected to said rear end thereof, said base having a second side frame pivotally connected to said rear end thereof.

* * * * *